INVENTORS
HOMER A. GRAY
BY GEORGE F. WICHMANN
ATTORNEYS

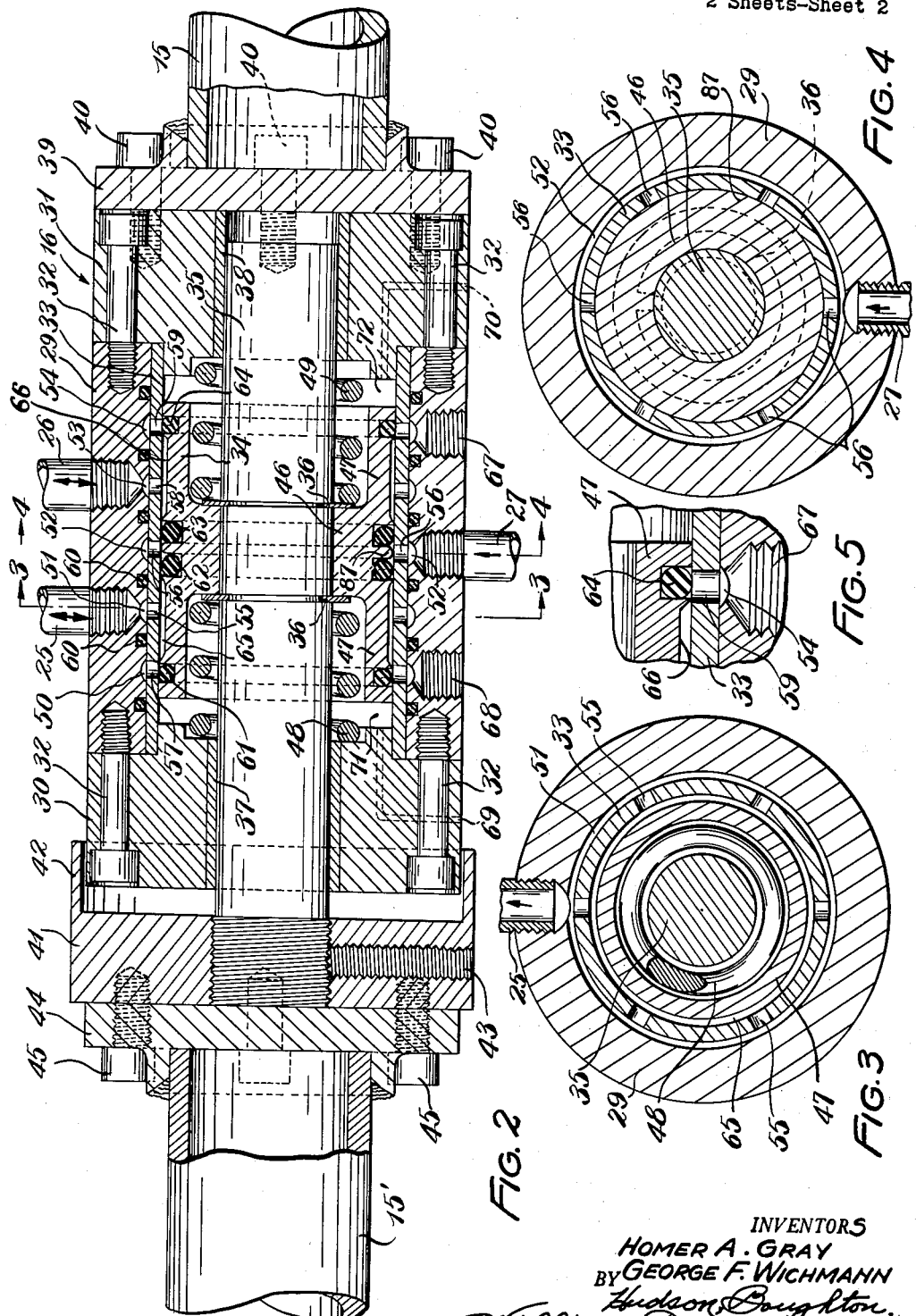
Dec. 13, 1960 H. A. GRAY ET AL 2,964,119
POWER STEERING MECHANISM
Filed Nov. 9, 1956 2 Sheets-Sheet 2
INVENTORS
HOMER A. GRAY
BY GEORGE F. WICHMANN
ATTORNEYS

United States Patent Office 2,964,119
Patented Dec. 13, 1960

2,964,119

POWER STEERING MECHANISM

Homer A. Gray, Northfield, and George F. Wichmann, Shaker Heights, Ohio, assignors of one-half to Apsco Manufacturing Corporation, Cleveland, Ohio, a corporation of Ohio, and one-half to Air-O-Matic Power Steer Corporation, Cleveland, Ohio, a corporation of Ohio Filed Nov. 9, 1956, Ser. No. 621,233

5 Claims. (Cl. 180—79.2)

This invention relates to power steering mechanism, especially mechanism driven by pneumatic power.

One of the objects of the invention is the provision of a control valve disposed in the drag link of the steering mechanism of a character such that in the event of a failure of power, manual steering will be available.

Another object is the provision of a valve mechanism in the drag link responsive to initial manual operation of the steering wheel and possessing strength and stability sufficient to resist any tendency toward dislodging or misalignment.

Another object is the provision of control valve mechanism comprising spring means tending to return the control valve to neutral position immediately after the operator's steering effort is released.

Another object is the provision of a valve which is influenced by spring means to return to neutral when the driver's steering effort is relaxed, thereby cutting off pressure fluid from its source and opening to atmosphere both ends of a motor cylinder from which the steering mechanism is power driven.

Other objects and features of novelty will appear as we proceed with the description of that embodiment of the invention which, for the purposes of the present application, we have illustrated in the accompanying drawings, in which:

Fig. 2 is a longitudinal view, largely in section, of the control valve mechanism in the drag link of an automobile steering linkage.

Figure 1:
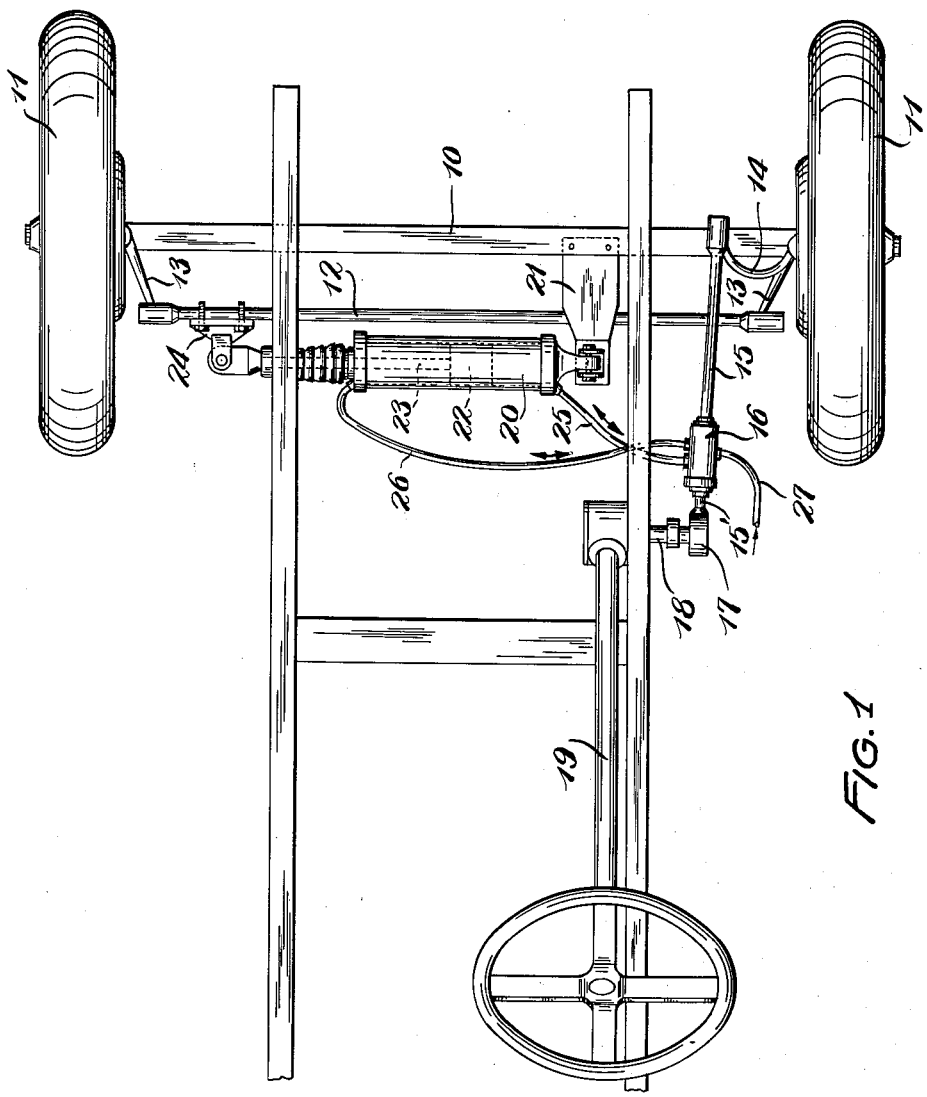
Fig. 1 is a schematic view illustrating one application of the invention to the dirigible wheels of a vehicle.

Figs. 3 and 4 are cross-sectional views taken substantially on the lines 3—3 and 4—4 of Fig. 2, and Fig. 5 is a fragmental sectional view on a larger scale.

Referring first to Fig. 1 of the drawing, 10 represents the rigid front axle of an automobile, upon which are carried in a conventional manner dirigible front wheels 11. A transversely movable tie rod 12 is suitably connected at its ends to links 13, with one of which there is joined an element 14 of the steering linkage that is adapted to be actuated by a drag link 15. A control valve 16 constitutes a part of the drag link and a further part 15' extends to and is connected with a pitman arm 17 that is carried upon a short shaft 18 arranged to be swung back and forth by gearing at the lower end of a steering column 19. The drag link 15', 16, 15 may be manipulated manually to steer the vehicle.

Power steering utilizes a fluid motor comprising a double ended cylinder 20 connected at one end to a bracket 21 attached to the front axle 10. In the cylinder 20 there is a piston 22 having a connecting rod 23 the free end of which is pivoted to a bracket 24 secured to the tie rod 12. Flexible pressure fluid conductors 25 and 26 run from opposite ends of cylinder 20 to the control valve 16, and a compressed air supply conductor 27 from a source not shown is connected with valve 16. Obviously, when one of the conductors 25 or 26 passes compressed air from conductor 27 to one end of cylinder 20 while fluid is exhausted from the other of those two conductors, the wheels are turned in one direction, while flow to the other of the conductors 25, 26 turns the wheels in the opposite direction.

Referring now to Figs. 2 to 5, there is shown an outer valve member consisting of a cylindrical element 29 and end walls 30 and 31, these elements being secured together by suitable means such as screws 32. Cylindrical element 29 has a liner sleeve 33 of low friction metal. There is also an inner valve member comprising a casing or forging 34 and a shaft 35, these two elements being locked together by snap rings 36. Shaft 35 is freely slidable in bushings 37 and 38 mounted in the end wall elements 30 and 31 of the outer valve member.

The drag link 15 is welded to a circular plate 39 which in turn is bolted to the end wall 31 by bolts 40, so that the outer member of the valve 16 is rigid with the drag link 15. Shaft 35 is threaded into or otherwise secured to a cap 41 which has an annular flange 42 that overhangs the end wall 30 and deflects dirt which might otherwise tend to settle on the exposed portion of shaft 35. After the cap 41 has been threaded into place to the desired extent it may be held in that position permanently by a set screw 43. Thereafter a circular end plate 44 which is welded to drag link 15' is fastened to cap 41 by bolts 45.

The element 34 of the inner valve member has a central portion 46 disposed between the snap rings 36 and two annular flanges 47 spaced away from the shaft 35 to form recesses within which are mounted coil springs 48 and 49 that are identical in size and strength, each bearing at its inner end upon the snap rings 36 and the central portion 46 of the element 34, and at their outer ends upon the end walls 30 and 31 of the outer valve member. These springs therefore tend to hold the inner and outer members of the valve in their intermediate position, which is the neutral position of the valve.

The cylindrical element 29 of the outer valve member is provided with five annular grooves 50, 51, 52, 53 and 54, which may be spaced apart substantially equal distances. At regular intervals throughout the liner 33 there are ports 55 registering with the groove 51 as shown in Fig. 3, and at regular intervals the groove 52 registers with ports 56 as indicated in Fig. 4. Similarly, the liner 33 has ports 57 registering with the groove 50, ports 58 registering with the groove 53, and ports 59 registering with the groove 54. The cylindrical element 29 is also provided with annular grooves in which are mounted O-rings 60 of rubber or the like which prevent leakage from one groove to the next and from the end grooves 50 and 54 around the ends of cylindrical element 29.

In the outer surface of inner valve member 34 there are annular grooves in which are mounted O-rings 61, 62, 63 and 64. Between the grooves for rings 61 and 62 there is a shallow relatively wide groove or recess 65 and between the grooves for rings 63 and 64 there is a similar shallow wide groove or recess 66. Between the grooves for rings 62 and 63 there is a narrow land 87 which normally lies in the plane of the groove 52 and closes off at least partially the ports 56. While we have shown a metal land 87 with O-ring gaskets on either side thereof, it will be appreciated that this part of the construction may be varied more or less without departing from the spirit of the invention. For example, a single somewhat larger O-ring could be substituted for the land. As hereinafter used, therefore, the term "land" may be construed to be anything which cuts off the compressed air intake when the valve elements are in their normal intermediate position, and which may be shifted so as to communicate the intake ports 56 with one or the other of the shallow annular recesses 65 or 66. The O-rings 61 and 64 are also effective as lands and may be thus referred to hereinafter.

When the operator of a vehicle embodying the steering mechanism of the invention desires to turn the wheels 11 in one direction or the other, he manipulates the steering wheel to swing the pitman arm 17 in the desired direction, causing the shaft 35 to move in that direction. This may shift the inner member of the valve to the right, for example, which will cause the O-ring 62 to move across the ports 56 and connect those ports with the shallow groove 65. Pressure fluid will then flow from the intake conductor 27 through the groove 52, ports 56, groove 65, ports 55 and groove 51 to conductor 25 leading to one end of motor cylinder 20. At the same time shallow groove 66 will have been caused to bridge ports 58 and 59 so that any pressure fluid that may have been present in the opposite end of motor cylinder 20 will be exhausted through conductor 26, groove 53, ports 58, groove 66, ports 59, and groove 54 to an exhaust port 67 open to atmosphere.

Where the pressure fluid is introduced through the conductor 25, piston 22 will move in a direction to turn wheels 11 toward the right. This will create a pull on drag link 15 which will cause the outer valve member to move toward the right, tending to return the valve members to neutral position, and that procedure will continue as long as the operator continues to turn the steering wheel. As soon as the desired turn is completed the operator releases his grip on the steering wheel and the drag links 15, 15' return to normal position just as in a manual steering arrangement. Also the inner and outer valve members return to their normal intermediate position under the influence of the springs 48 and 49. Any pressure fluid then tending to enter through conductor 27 is partially blocked by land 67, but is fully sealed off by the two O-rings 62 and 63. Any pressure remaining in one end of the motor cylinder 20 is quickly dissipated through the valve, because when the inner valve member is in neutral position the grooves 65 and 66 project to a slight extent over the ports 57 and 59, sufficient however to enable the pressure fluid to escape through one or the other of exhaust ports 67 and 68. This condition is illustrated clearly in the fragmental view of Fig. 5.

Drilled passages 69 and 70 are provided to prevent the possibility of pressure in the spaces 71 and 72 being built up by leakage of pressure fluid past the gaskets.

In the event that there should be a failure in the supply of power fluid manual steering may be used. The drag link 15, 15' will then perform its usual function just as though there were no control valve present, except that when resistance to steering movement is considerable one or the other of springs 48 and 49 must first be compressed before a push or pull on link 15' can be transmitted to link 15. In an extreme case the inner member may have to be moved by the shaft 35 until one of the flanges 47 contacts an end wall 30 or 31 before steering effort becomes effective.

Having thus described our invention, we claim:

1. In a vehicle, dirigible wheels, mechanical connections for turning said wheels including a drag link, a compressed air motor operatively attached to said mechanical connections and comprising a double ended cylinder, said drag link comprising an inner valve member and an outer valve member longitudinally movable relative to each other, the inner member having a central shaft slidably mounted in the outer member, spring means tending to hold said members in a normal intermediate position, the outer member having an internal cylindrical surface, the inner member having a central portion bearing upon and locked to said shaft and having an outer generally cylindrical surface slidable upon the internal cylindrical surface of said outer member, said outer member having a central intake port connected to a source of compressed air and having delivery ports on opposite sides of said central port connected to opposite ends of said double ended cylinder and having outer ports leading to exhaust, and said inner member having a central annular land normally disposed opposite said intake port and end lands spaced from said central land on each side thereof and each joined to said central land by a recess, a pair of spaced annular gaskets on said annular land bearing against the internal surface of said outer member on opposite sides of said intake port, said inner member having two annular end gaskets bearing on the internal cylindrical surface of said outer member and each of said end gaskets being disposed on a respective one of said lands and said recesses normally connecting said delivery ports to said outer ports, whereby the pressure port is normally blocked by said central land and the gaskets thereon and the relative movement of said members in opposition to said spring means will disconnect one end of said motor cylinder from exhaust and progressively open the latter to said intake port while maintaining the other end of said motor cylinder connected to exhaust.

2. Mechanism as defined in claim 1, wherein said inner member on each side of its central portion is spaced from said shaft and said spring means consists of two spiral springs surrounding the shaft and interposed between said central portion of the inner member and those portions of the outer member in which the shaft has slidable bearing.

3. Mechanism as defined in claim 1, wherein there are a series of small intake ports spaced around the outer cylindrical member in a plane at right angles to said shaft, and wherein each of said first named gaskets is an O-ring mounted in the inner member and wherein the relative movement of the parts is sufficient to carry one of the inner O-rings across said intake ports.

4. In a vehicle, dirigible wheels, mechanical connections for turning said wheels including a drag link, a compressed air motor operatively attached to said mechanical connections and comprising a double-ended cylinder, said drag link comprising an inner valve member and an outer valve member longitudinally movable relative to each other, the inner member having a central shaft slidably mounted in the outer member, spring means tending to hold said members in a normal intermediate position, the outer member having an internal cylindrical surface, the inner member having a portion fixed to said shaft and having an outer generally cylindrical surface slidable upon the internal cylindrical surface of said outer member, said outer member having a central intake port connected to a source of compressed air and having delivery ports on opposite sides of said central port connected to opposite ends of said double-ended cylinder and having outer ports leading to exhaust, and said inner member having a central annular land normally disposed opposite said intake port and end lands spaced from said central land on each side thereof and each joined to said central land by a recess, a pair of spaced annular gaskets on said annular land bearing against the internal surface of said outer member on opposite sides of said intake port, said inner member having two annular end gaskets bearing on the internal cylindrical surface of said outer member and each of said end gaskets being disposed on a respective one of said lands and said recesses normally connecting said delivery ports to said outer ports, whereby the pressure port is normally blocked by said central land and the gaskets thereon and the relative movement of said members in opposition to said spring means will disconnect one end of said motor cylinder from exhaust and progressively open the latter to said intake port while maintaining the other end of said motor cylinder connected to exhaust.

5. In a vehicle, dirigible wheels, mechanical connections for turning said wheels including a drag link, a compressed air motor operatively attached to said mechanical connections and comprising a double-ended cylinder, said drag link comprising an inner valve member and an outer valve member having a normal relative position and longitudinally movable relative to each other in first and second opposite directions from said normal position, the inner member having a central shaft and being slidably mounted in the outer member, spring means tending to hold said members in said normal relative position, the outer member having an internal cylindrical surface, the inner member having an outer generally cylindrical surface slidable upon the internal cylindrical surface of said outer member, pressure port means and exhaust port means in said outer member, one of said port means comprising a pair of spaced ports opening into said internal cylindrical surface and the other of said port means comprising a central port opening into said cylindrical surface intermediate said pair of spaced ports, first and second cylinder ports in said outer member and opening into said internal cylindrical surface, said first cylinder port being between one of said pair of spaced ports and said central port and said second cylinder port being between the other of said pair of spaced ports and said central port, said inner member having land means blocking connection between said pressure port means and said cylinder ports when said members are in their said normal relative position, said land means including gasket means bearing on said internal cylindrical surface intermediate said pressure port means and each of said cylinder ports and progressively opening said pressure port means to said first and second cylinder ports respectively on relative movement of said members in their said first and second directions respectively from their said normal position, said inner member further having second land means disposed adjacent said exhaust port means and disposed to place said cylinder ports in communication with said exhaust port means when said members are in their normal relative position and to maintain connection of said second cylinder port and block connection of said first cylinder port to said exhaust port means upon relative movement of said members in said first direction from their normal position and to maintain connection of said first cylinder port and block connection of said second cylinder port to said exhaust port means when said members are relatively moved in their said direction from their said normal relative position, said second land means including gasket means bearing on the internal cylindrical surface of said outer member and said cylinder ports being connected to opposite ends of said cylinder.

References Cited in the file of this patent

UNITED STATES PATENTS

| | | |
|---|---|---|
| 872,820 | Johnson | Dec. 3, 1907 |
| 2,608,263 | Garrison | Aug. 26, 1952 |
| 2,621,050 | Campbell | Dec. 9, 1952 |
| 2,676,663 | Smith | Apr. 27, 1954 |
| 2,826,258 | Livers | Mar. 11, 1958 |
| 2,827,974 | Frank | Mar. 25, 1958 |

FOREIGN PATENTS

| | | |
|---|---|---|
| 47,236 | France | Nov. 25, 1936 |
| | (2nd addition to 801,509) | |

OTHER REFERENCES

"The Autocar" (Dewandre), published Feb. 19, 1954 (pages 240, 241, 242).